(12) United States Patent
Fischer

(10) Patent No.: US 7,903,578 B2
(45) Date of Patent: Mar. 8, 2011

(54) WIRELESS COMMUNICATION METHOD FOR TRANSMITTING A SEQUENCE OF DATA UNITS BETWEEN A WIRELESS DEVICE AND A NETWORK

(75) Inventor: Patrick Fischer, Paris (FR)

(73) Assignee: LG Electronics, Inc., Seoul (KR)

( * ) Notice: Subject to any disclaimer, the term of this patent is extended or adjusted under 35 U.S.C. 154(b) by 141 days.

(21) Appl. No.: 12/195,267

(22) Filed: Aug. 20, 2008

(65) Prior Publication Data

US 2009/0196191 A1 Aug. 6, 2009

Related U.S. Application Data

(60) Provisional application No. 61/026,117, filed on Feb. 4, 2008.

(51) Int. Cl.
*G06F 11/00* (2006.01)
(52) U.S. Cl. ........................................................ 370/252
(58) Field of Classification Search ............... 370/252, 370/389
See application file for complete search history.

(56) References Cited

U.S. PATENT DOCUMENTS

| 6,163,861 A | 12/2000 | Yoshioka |
| 6,594,486 B1 | 7/2003 | Rasanen |
| 6,697,331 B1 | 2/2004 | Riihinen et al. |
| 6,801,512 B1 | 10/2004 | Cudak et al. |
| 7,184,426 B2 | 2/2007 | Padovani et al. |
| 2004/0248575 A1 | 12/2004 | Rajala et al. |
| 2006/0034277 A1* | 2/2006 | Jang et al. ............... 370/389 |
| 2007/0277074 A1 | 11/2007 | Yeo et al. |
| 2008/0294958 A1* | 11/2008 | Lee et al. ................. 714/748 |

FOREIGN PATENT DOCUMENTS

| WO | 2006/118418 | 11/2006 |
| WO | 2007/078142 | 7/2007 |
| WO | 2007/127950 | 11/2007 |

OTHER PUBLICATIONS

3GPP TS 36 36.323 V8.0.0, $3^{rd}$ Generation Partnership project: Technical Specification Group Radio Access Network; Evolved Univeral Terrestrial Radio Access (E-UTRA); Packet Data Convergence Protocol (PDCP) specification (release 8), Dec. 2007.*

(Continued)

*Primary Examiner* — Albert T Chou
(74) *Attorney, Agent, or Firm* — Lee, Hong, Degerman, Kang & Waimey

(57) ABSTRACT

Method for transmitting a status report for a sequence of data transmitted along a wireless communication link between a wireless device and a network having several base stations, said link having a transmitting side and a receiving side. The method comprises: on the receiving side, determining status information on data units of the sequence, including a first set of data units comprising a first non-received data unit in the sequence and data units following said first non-received data unit, the status information indicating whether each data unit has been received or not on the receiving side; and transmitting, from the receiving side to the transmitting side, a status report containing a bitmap providing the status information for a second set of data units included in said first set, such that the bitmap has a predetermined maximum size.

20 Claims, 7 Drawing Sheets

OTHER PUBLICATIONS

3rd Generation Partnership Project (3GPP), "Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)", Technical Specification 3GPP TS 36.300, V8.3.0, Dec. 2007.

3rd Generation Partnership Project (3GPP), "Technical Specification Group Radio Access Network; Evolved Universal Terrestrial Radio Access (E-UTRA); Packet Data Convergence Protocol (PDCP) Specification (Release 9)," Technical Specification 3GPP TS 36.323, V9.0.0, Dec. 2009.

* cited by examiner

WIRELESS COMMUNICATION METHOD FOR TRANSMITTING A SEQUENCE OF DATA UNITS BETWEEN A WIRELESS DEVICE AND A NETWORK

This application claims priority of U.S. Provisional Application No. 61/026,117 filed on Feb. 4, 2008, the content of which is incorporated herein by reference

BACKGROUND OF THE INVENTION

1. Field of the Invention

The present invention relates to wireless communication. It more particularly relates to selective retransmission of data units between a wireless device and a network, depending on whether they have been received or not.

While it is described below in the context of an LTE (Long Term Evolution) type of cellular network for illustration purposes and because it happens to be well suited to that context, those skilled in the communication art will recognize that the invention disclosed herein can also be applied to various other types of cellular networks.

2. Discussion of the Related Art

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long term evolution (LTE) of UMTS, also known as evolved universal mobile telecommunication system (E-UMTS), is under discussion by the 3rd generation partnership project (3GPP) that standardized UMTS.

LTE is a technology for enabling high-speed packet communications. Many schemes have been proposed for the LTE objective including those that aim to reduce user and provider costs, improve service quality, and expand and improve coverage and system capacity. LTE requires reduced cost per bit, increased service availability, flexible use of a frequency band, a simple structure, an open interface, and adequate power consumption of a terminal as an upper-level requirement.

Figure 1:
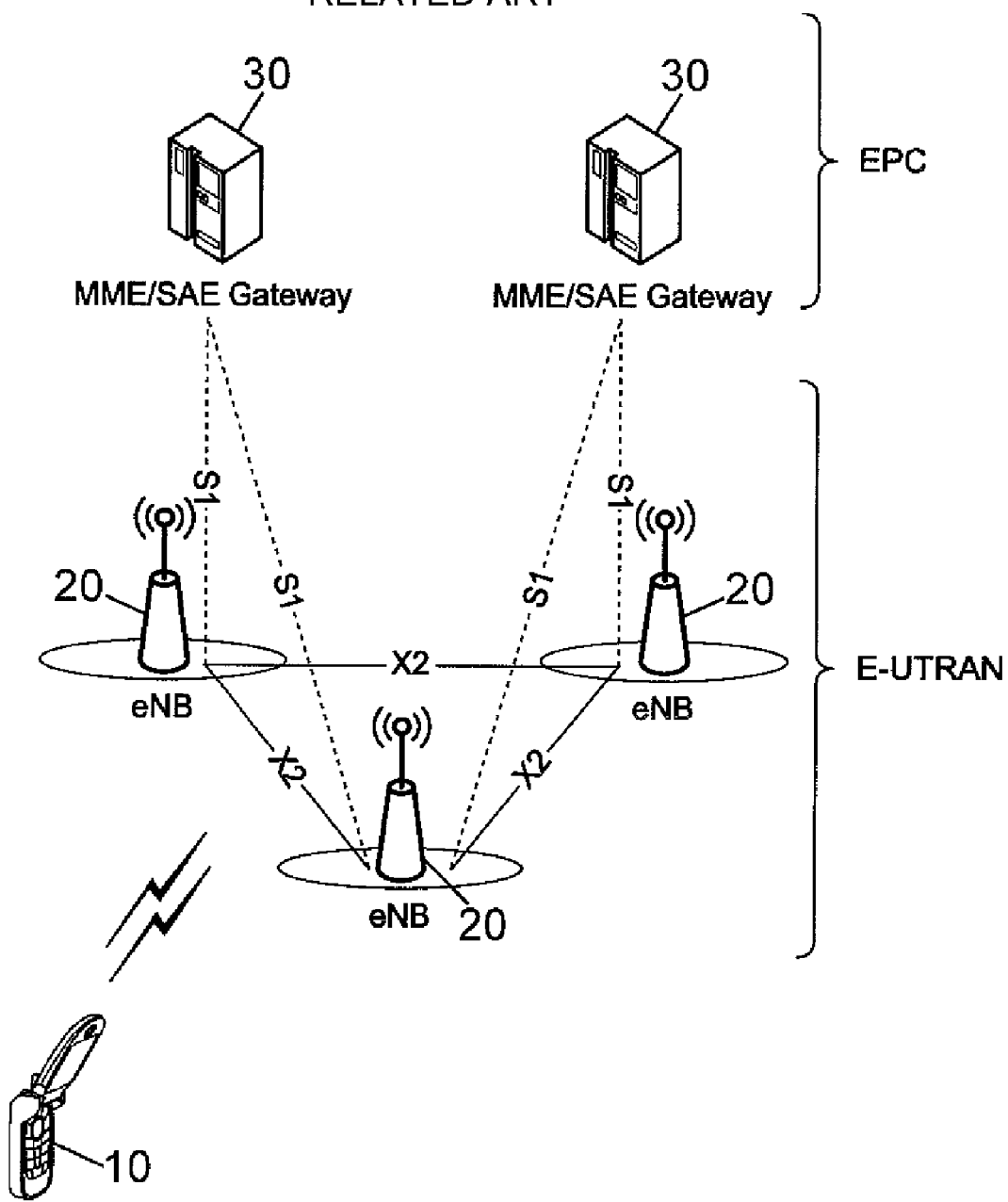

FIG. 1 is a block diagram illustrating network structure of an LTE system. The communication network is widely deployed to provide a variety of communication services such as voice and packet data.

As illustrated in FIG. 1, the E-UMTS network includes an evolved UMTS terrestrial radio access network (E-UTRAN) and an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also be referred to as a mobile station (MS), a user terminal (UT), a subscriber station (SS) or a wireless device.

An eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including distribution of paging messages to eNodeBs 20, security control, idle state mobility control, SAE bearer control, and ciphering and integrity protection of non-access stratum (NAS) signaling. The SAE gateway host provides assorted functions including termination of U-plane packets for paging reasons, and switching of the U-plane to support UE mobility. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

Figure 2A:
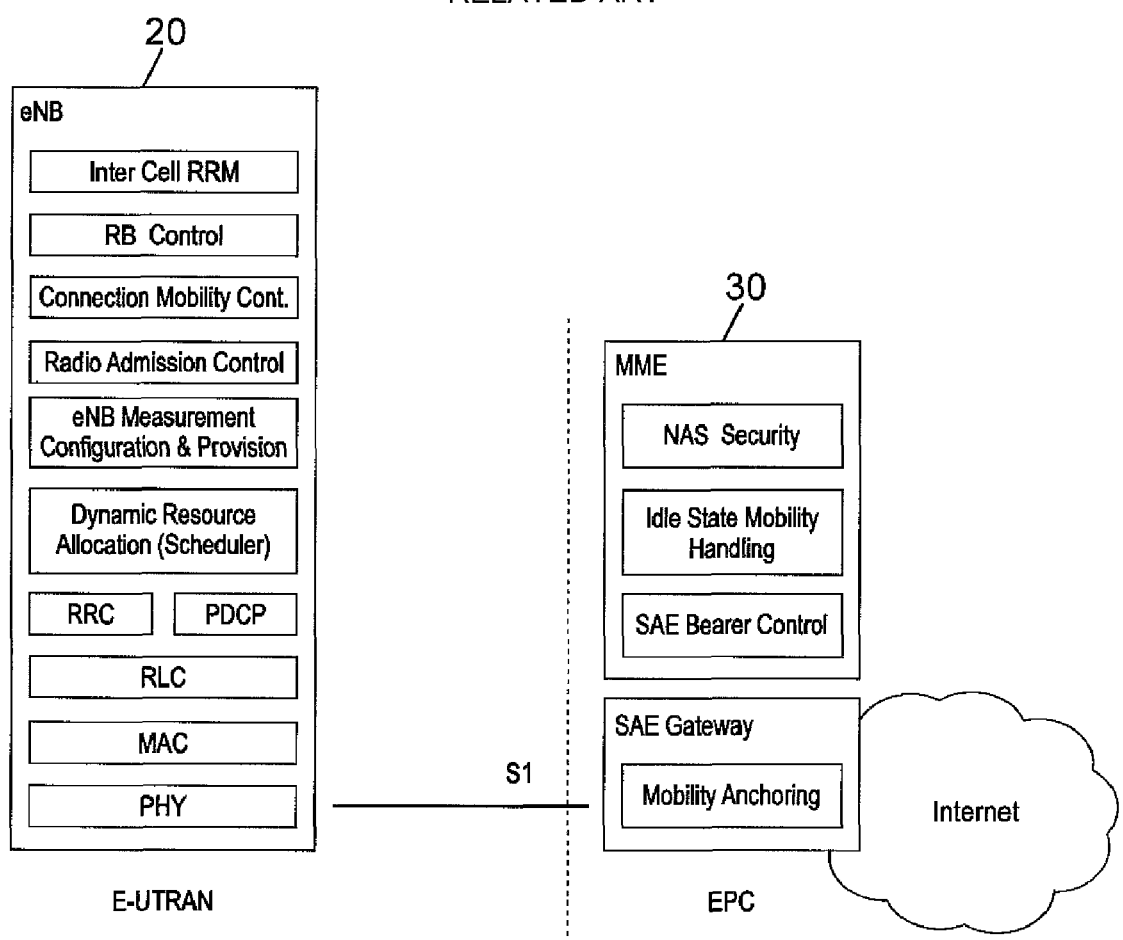

FIG. 2(a) is a block diagram depicting the architecture of a typical E-UTRAN and a typical EPC. As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

Figure 2B:
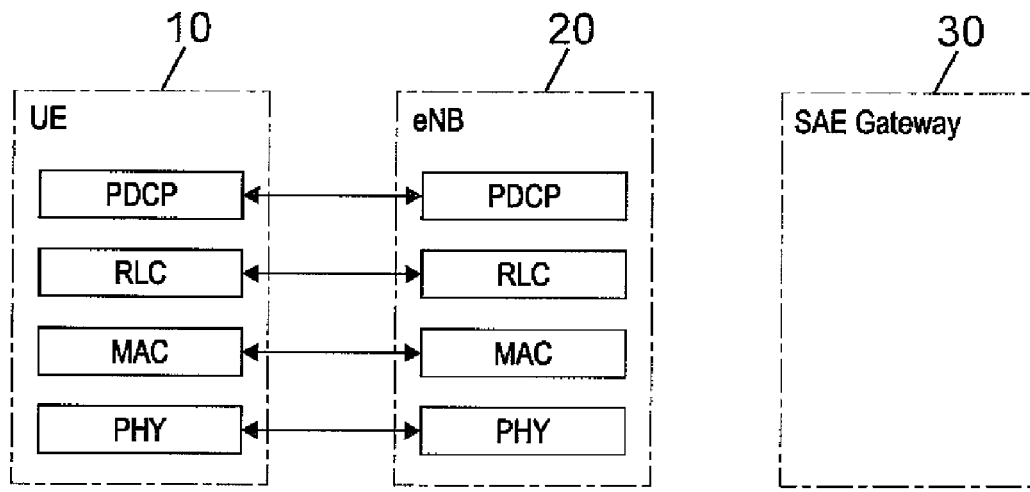
Figure 2C:
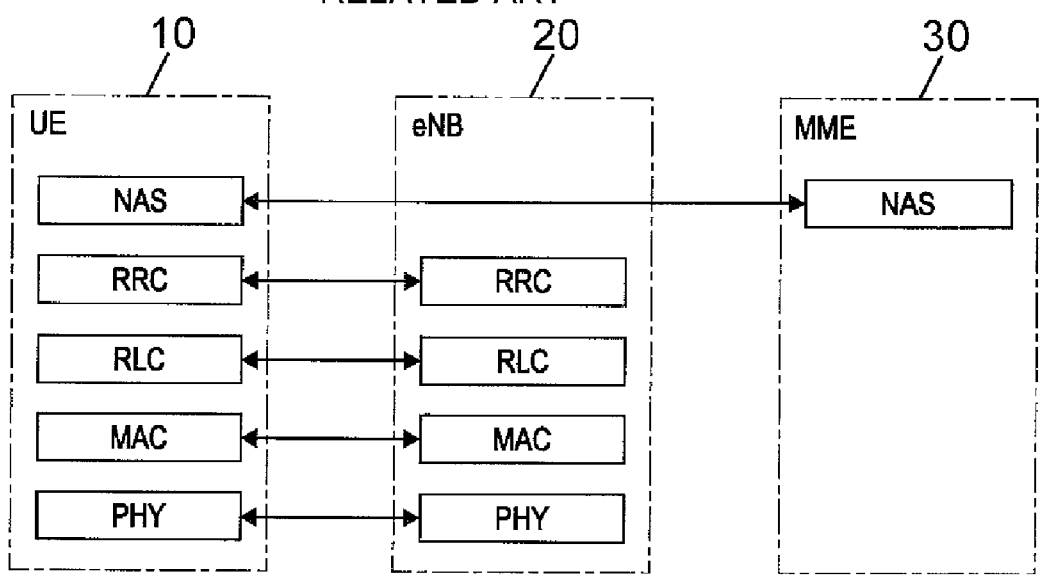

FIGS. 2(b) and 2(c) are block diagrams depicting the user-plane protocol and the control-plane protocol stack for the E-UMTS. As illustrated, the protocol layers may be divided into a first layer (L1), a second layer (L2) and a third layer (L3) based upon the three lower layers of an open system interconnection (OSI) standard model that is well-known in the art of communication systems.

The physical layer, the first layer (L1), provides an information transmission service to an upper layer by using a physical channel. The physical layer is connected with a medium access control (MAC) layer located at a higher level through a transport channel, and data between the MAC layer and the physical layer is transferred via the transport channel. Between different physical layers, namely, between physical layers of a transmission side and a reception side, data is transferred via the physical channel.

The MAC layer of Layer 2 (L2) provides services to a radio link control (RLC) layer (which is a higher layer) via a logical channel. The RLC layer of Layer 2 (L2) supports the transmission of data with reliability. It should be noted that the RLC layer illustrated in FIGS. 2(b) and 2(c) is depicted because if the RLC functions are implemented in and performed by the MAC layer, the RLC layer itself is not required. The PDCP layer of Layer 2 (L2) performs a header compression function that reduces unnecessary control information such that data being transmitted by employing Internet protocol (IP) packets, such as IPv4 or IPv6, can be efficiently sent over a radio (wireless) interface that has a relatively small bandwidth. The PDCP layer receives SDUs (Service Data Units) as an input and delivers compressed PDUs (Packet Data Units) as an output to lower layers.

A radio resource control (RRC) layer located at the lowest portion of the third layer (L3) is only defined in the control plane and controls logical channels, transport channels and the physical channels in relation to the configuration, reconfiguration, and release of the radio bearers (RBs). Here, the RB signifies a service provided by the second layer (L2) for data transmission between the terminal and the E-UTRAN.

As illustrated in FIG. 2(b), the RLC and MAC layers (terminated in an eNodeB 20 on the network side) may perform functions such as Scheduling, Automatic Repeat Request (ARQ), and hybrid automatic repeat request (HARQ). The PDCP layer (terminated in eNodeB 20 on the network side) may perform the user plane functions such as header compression, integrity protection, and ciphering.

As illustrated in FIG. 2(c), the RLC and MAC layers (terminated in an eNodeB 20 on the network side) perform the same functions as for the control plane. As illustrated, the RRC layer (terminated in an eNodeB 20 on the network side) may perform functions such as broadcasting, paging, RRC connection management, Radio Bearer (RB) control, mobility functions, and UE measurement reporting and controlling. The NAS control protocol (terminated in the MME of gateway 30 on the network side) may perform functions such as a SAE bearer management, authentication, LTE_IDLE mobility handling, paging origination in LTE_IDLE, and security control for the signaling between the gateway and UE 10.

The NAS control protocol may use three different states; first, a LTE_DETACHED state if there is no RRC entity; second, a LTE_IDLE state if there is no RRC connection while storing minimal UE information; and third, an LTE_ACTIVE state if the RRC connection is established. Also, the RRC state may be divided into two different states such as a RRC_IDLE and a RRC_CONNECTED.

In RRC_IDLE state, the UE 10 may receive broadcasts of system information and paging information while the UE specifies a Discontinuous Reception (DRX) configured by NAS, and the UE has been allocated an identification (ID) which uniquely identifies the UE in a tracking area. Also, in RRC-IDLE state, no RRC context is stored in the eNodeB.

In RRC_CONNECTED state, the UE 10 has an E-UTRAN RRC connection and a context in the E-UTRAN, such that transmitting and/or receiving data to/from the network (eNodeB) becomes possible. Also, the UE 10 can report channel quality information and feedback information to the eNodeB.

In RRC_CONNECTED state, the E-UTRAN knows the cell to which the UE 10 belongs. Therefore, the network can transmit and/or receive data to/from UE 10, the network can control mobility (handover) of the UE, and the network can perform cell measurements for a neighboring cell.

In RRC_IDLE mode, the UE 10 specifies the paging DRX (Discontinuous Reception) cycle. Specifically, the UE 10 monitors a paging signal at a specific paging occasion of every UE specific paging DRX cycle.

A wireless communication link is a link between a wireless device (e.g. a UE in the context of LTE) and a network having a plurality of base stations (e.g. eNodeBs in the context of LTE). As it is directional, such a wireless communication link has a data unit transmitting side and a data unit receiving side. Depending on the direction of the link, the wireless device may be on the data unit transmitting side while the network is on the data unit receiving side, or the wireless device may be on the data unit receiving side while the network is on the data unit transmitting side.

Under some circumstances, a handover of such a wireless communication link with a wireless device may be initiated from a source base station to a target base station.

It is reminded that the handover procedure is made to transfer, or hand off, a pending communication from a source cell, serviced by a source eNodeB, to a target cell, serviced by a target eNodeB. We consider here the non limiting case where the source and target cells are not serviced by the same eNodeB.

Figure 3:
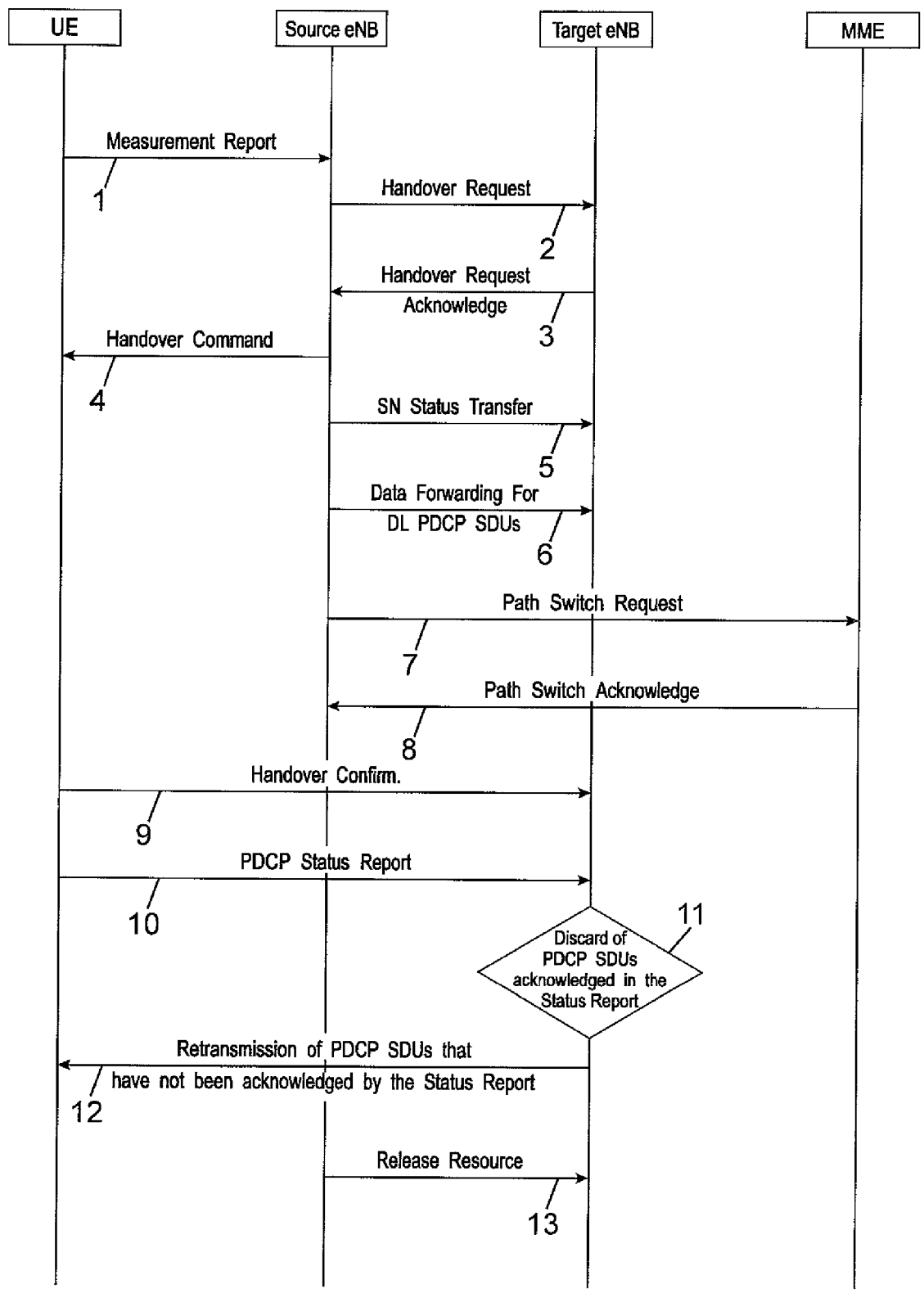

FIG. 3 schematically shows transmissions in relation to a wireless communication link in which the wireless device is on the data unit receiving side and the network is on the data unit transmitting side of the wireless communication link, a handover of the wireless communication link with the UE being initiated from a source eNodeB to a target eNodeB.

Further detail on the transmitted messages can be found in the relevant LTE technical specifications, in particular in the 3GPP TS 36.423 V8.0.0 "3rd Generation Partnership Project; Technical Specification Group Radio Access Network; Evolved Universal Terrestrial Radio Access Network (EU-TRAN); X2 application protocol (X2AP) (Release 8)" and in the 3GPP TS 36.300 V8.3.0 "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", both released in December 2007.

Before the handover procedure starts, a sequence of (downlink) data units is transmitted along the wireless communication link from the source eNodeB to the UE.

The data units considered here are data units of the PDCP (Protocol Data Convergence Protocol) layer, also called PDCP SDUs (Service Data Units). PDCP in the context of LTE is fully described in the technical specification 3GPP TS 36.323 V8.0.0 "3rd Generation Partnership Project; Technical Specification Group Radio Access Network; Evolved Universal Terrestrial Radio Access (E-UTRA); Packet Data Convergence Protocol (PDCP) specification (Release 8)", released in December 2007.

Other types of data units may however be considered as well, as will appear to one skilled in the art. In particular, data units of a layer different from PDCP could be considered.

The source eNodeB configures the UE measurement procedures, which form part of the RRC protocol depicted in FIG. 2(a), according to area restriction information provisioned in each eNodeB. This may be done by sending one or more MEASUREMENT CONTROL messages to the UE in the RRC_CONNECTED state. Measurements requested by the source eNodeB may assist the function controlling the UE's connection mobility. The UE is then triggered to send MEASUREMENT REPORT messages (reference 1) according to rules set by e.g. system information broadcast by the source eNodeB and/or specified in the MEASUREMENT CONTROL message or additional downlink signaling.

For each UE in the RRC_CONNECTED state, the source eNodeB runs one or more handover control algorithms whose inputs include the measurements reported by the UE and possibly other measurements made by the source eNodeB. Depending on the measurements, the source eNodeB may decide to hand off the UE to a target eNodeB. When this occurs, the source eNodeB issues a HANDOVER REQUEST message to the target eNodeB (reference 2), passing necessary information to prepare the handover on the target side. Such information includes a UE X2 signaling context reference at the source eNodeB, a UE S1 EPC signaling context reference, a target cell identifier, an RRC context and a SAE bearer context. The UE X2 and UE S1 signaling context references enable the target eNodeB to address the source eNodeB and the EPC. The SAE bearer context includes necessary radio network layer (RNL) and transport network layer (TNL) addressing information.

An admission control function may be performed by the target eNodeB depending on the received SAE bearer quality of service (QoS) information to increase the likelihood of a successful handover, if the necessary resources are available at the target eNodeB. If the handover is admitted, the target eNodeB configures the resources according to the received SAE bearer QoS information and reserves a new cell-radio network temporary identifier (C-RNTI) for the sake of identifying the UE in the target cell. The target eNodeB prepares the handover in layers 1 and 2 and sends a HANDOVER REQUEST ACKNOWLEDGE message to the source eNodeB (reference 3). The HANDOVER REQUEST ACKNOWLEDGE message includes a transparent container to be passed to the UE 10. The container may include the new C-RNTI allocated by the target eNodeB, and possibly some other parameters such as access parameters, system information blocks (SIBs), etc. The HANDOVER REQUEST ACKNOWLEDGE message may also include RNL/TNL information for the forwarding tunnels, if necessary.

In response, the source eNodeB generates the HANDOVER COMMAND message of the RRC protocol and sends it towards the UE (reference 4). In parallel, the source eNodeB transfers to the target eNodeB part or all of the date units that are buffered for transmission to the UE and currently in transit towards the UE, as well as information relating to acknowledgement status of the data units by the UE.

The HANDOVER COMMAND message includes the transparent container, which has been received from the target eNodeB. The source eNodeB applies the necessary functions of integrity protection and ciphering to the message. The UE receives the HANDOVER COMMAND message with the necessary parameters (new C-RNTI, possible starting time, target eNodeB SIBs etc.) and is thereby instructed by the source eNodeB to perform the handover. The UE complies with the handover command by detaching from the source cell, getting synchronization and accessing the target cell.

When the UE has successfully accessed the target cell, it sends a HANDOVER CONFIRM message to the target eNodeB using the newly allocated C-RNTI (reference 9) to indicate that the handover procedure is completed on the UE side. The target eNodeB verifies the C-RNTI sent in the HANDOVER CONFIRM message. If the verification is positive, the EPC is informed by the HANDOVER COMPLETE message from the target eNodeB that the UE has changed cell. The EPC switches the downlink data path to the target side and it releases any U-plane/TNL resources towards the source eNodeB. The EPC confirms by returning a HANDOVER COMPLETE ACK message.

The target eNodeB then informs the source eNodeB that the handover was successful by sending a RELEASE RESOURCE message (reference 13), which triggers the release of resources, i.e. radio and C-plane related resources associated to the UE context, by the source eNodeB.

As shown in FIG. 3, after the handover from the source eNodeB to the target eNodeB was initiated (references 1-4), the source eNodeB forwards to the target eNodeB downlink PDCP SDUs for which reception in the UE has not been acknowledged to the source eNodeB (reference 6), such that the target eNodeB can retransmit them to the UE.

A PDCP status report is configured at the UE, which transfers it to a lower layer. A transmission unit in the UE may further transmit the PDCP status report (reference 10) to the target eNodeB. It is indicated by RRC signalling whether this PDCP status report shall be sent or not. The format and content of the PDCP status report appear in section 6.2.6 of the above mentioned TS 36.323 and is reproduced in FIG. 5.

Figure 5:
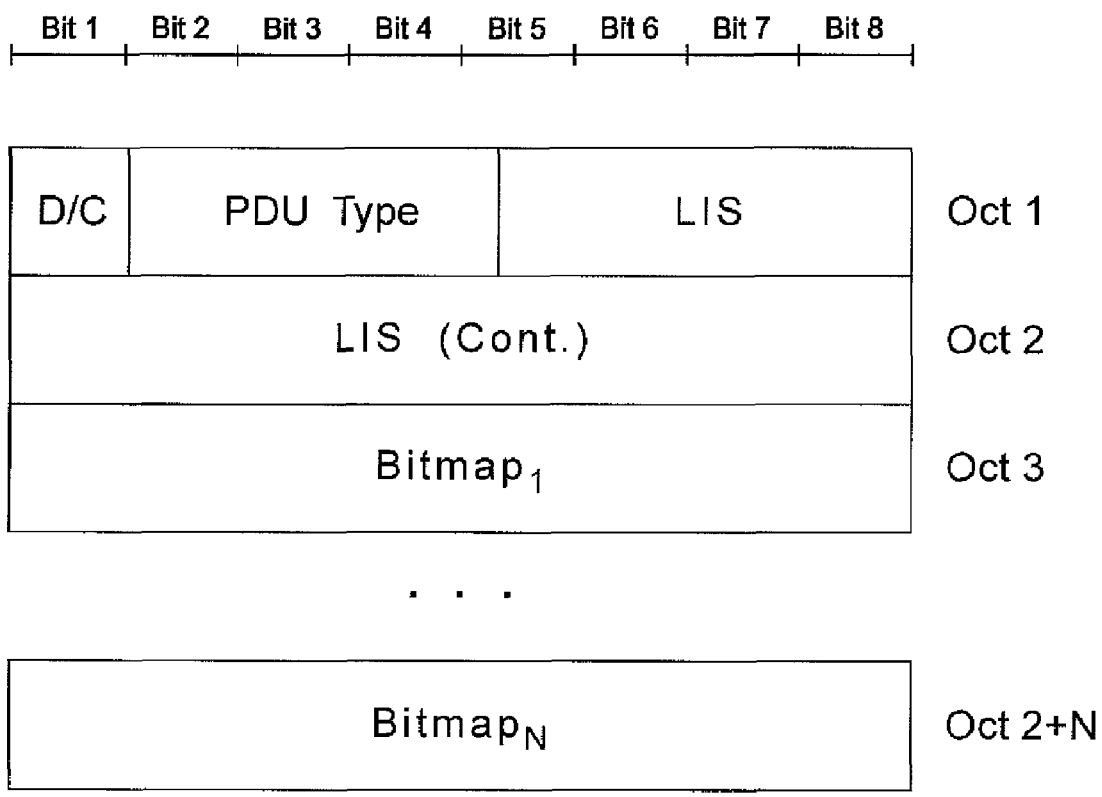

As shown in FIG. 5, the PDCP status report contains a 12 bits LIS field including the last in sequence received PDCP sequence number, that is the sequence number of the last PDCP SDU received in sequence by the UE.

"In sequence received PDCP SDUs" can be defined as received PDCP SDUs of the transmitted sequence of PDCP SDUs preceding the first non received PDCP SDU in the sequence. So, the LIS field is a pointer designating the PDCP SDU of the sequence preceding immediately the first non received PDCP SDU.

The PDCP status report also contains a bitmap providing status information on PDCP SDUs of the sequence, which may be stored in a storage unit of the UE and indicating, for each PDCP SDU having a sequence number (SN) higher than LIS (i.e. for each PDCP SDU of the sequence following the last in sequence received PDCP SDU), whether said PDCP SDU has been received or not by the UE.

More specifically, this bitmap has a variable size and is built such that the MSB (Most Significant Bit) of its first octet (Oct 3 in FIG. 5) indicates whether or not the PDCP PDU with the SN (LIS+1) modulo 4096 has been received and, optionally whether or not the corresponding PDCP PDU (Protocol Data Unit) has been decompressed correctly, while the LSB (Least Significant Bit) of the first octet (Oct 3 in FIG. 5) indicates whether or not the PDCP PDU with the SN (LIS+8) modulo 4096 has been received correctly. The same applies as far as the $N^{th}$ octet of the bitmap (Oct 2+N in FIG. 5), such that the bitmap can cover every PDCP SDU from the PDCP SDU following immediately the last in sequence received PDCP SDU to the last received PDCP SDU.

Each bit of the bitmap is set to:
  0 when the PDCP PDU with PDCP Sequence Number= (LIS+bit position) modulo 4096 has not been received or optionally has been received but has not been decompressed correctly; or
  1 when the PDCP PDU with PDCP Sequence Number= (LIS+bit position) modulo 4096 has been received correctly and may or may not have been decompressed correctly.

In other words, all positions in the bitmap corresponding to PDCP SDUs that have not been received as indicated by RLC and optionally, PDCP PDUs for which decompression has failed are set to 0, while all other positions in the bitmap are set to 1.

When the source eNodeB receives the PDCP status report, it can discard all PDCP SDUs that are indicated with the binary value 1 in the bitmap, as well as PDCP SDUs with a PDCP SN equal or lower than the PDCP SN indicated by the LIS field (reference 11 in FIG. 3).

The other PDCP SDUs, i.e. those indicated with the binary value 0 in the bitmap, can be retransmitted to the UE by the target eNodeB that has received them previously from the source eNodeB (reference 12).

In this way, in case the source eNodeB has not received up to date RLC status information from the UE prior to the handover, unnecessary retransmission by the target eNodeB of PDCP SDUs already received by the UE is prevented.

Figure 4:
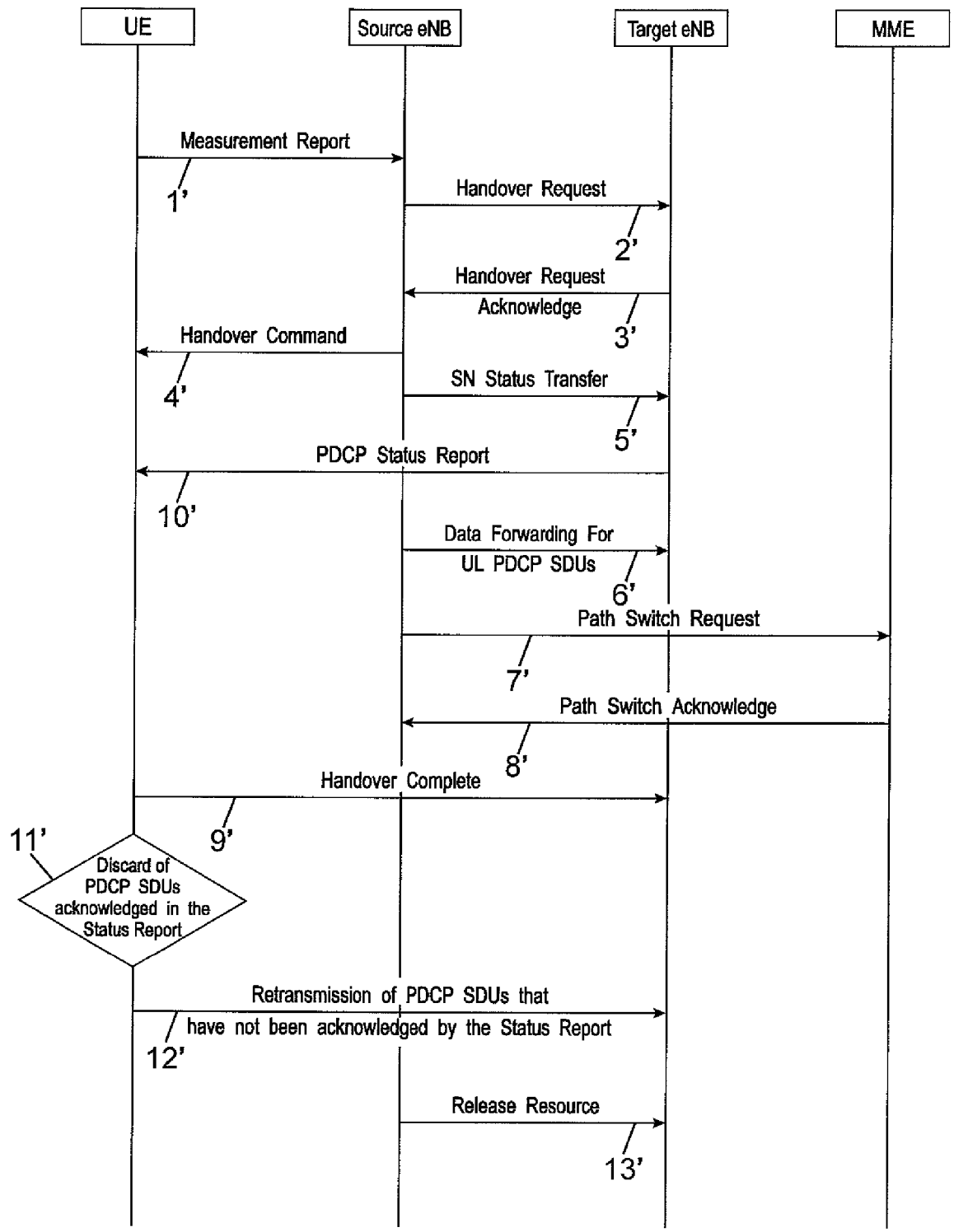

FIG. 4 schematically shows transmissions in relation to a wireless communication link in which the wireless device is on the data unit transmitting side and the network is on the data unit receiving side of the wireless communication link, a handover of the wireless communication link with the UE being initiated from a source eNodeB to a target eNodeB.

So, before the handover procedure starts, a sequence of (uplink) data units is transmitted along the wireless communication link from the UE to the source eNodeB.

Most of the transmissions shown in FIG. 4 are identical or similar to the ones in FIG. 3.

The SN status transfer message (reference 5') sent by the source eNodeB to the target eNodeB includes an indication of the last in sequence received PDCP sequence number as well as of whether or not the following uplink PDCP SDUs have been correctly received at the source eNodeB in the form of a bitmap.

Based on the information contained in the SN status transfer message, the target eNodeB may then build and transmit to the UE a PDCP status report (reference 10'), which like in the case illustrated in FIG. 3, may include a LIS field identifying the last in sequence received PDCP sequence number and a bitmap indicating whether the PDCP SDUs having sequence numbers (SNs) higher than LIS have been received or not by the source eNodeB.

When the UE receives the PDCP status report, it can discard all PDCP SDUs that are indicated with the binary value 1 in the bitmap, as well as PDCP SDUs with a PDCP SN equal or lower than the PDCP SN indicated by the LIS field (reference 11' in FIG. 4).

The other PDCP SDUs, i.e. those indicated with the binary value 0 in the bitmap, can be retransmitted to the target eNodeB by the UE (reference 12').

Of course, two wireless communication links having opposite directions may exist simultaneously between a UE and the network, one for transmitting downlink PDCP SDUs and the other for transmitting uplink PDCP SDUs. In this case, the above described mechanisms as illustrated in FIGS. 3 and 4 may both be carried out in parallel and selective retransmission may occur in both directions.

The size of the PDCP status report can vary a lot. Indeed, the bitmap may relate to just a few PDCP SDUs if the last received PDCP SDU is close to the last in sequence received PDCP SDU. In this case, a one octet bitmap could be enough. But, on the opposite, the PDCP status report may be quite long when the last received PDCP SDU is far away from the last in sequence received PDCP SDU, meaning that many (non in sequence received) PDCP SDUs were transmitted in between.

Figure 6:
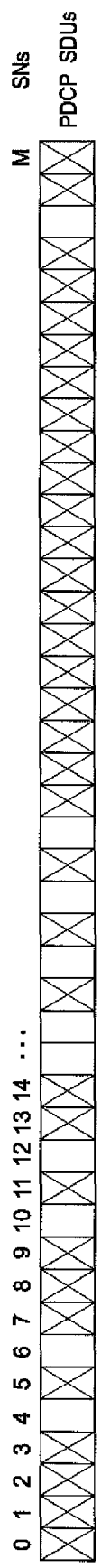

This situation is illustrated in FIG. 6, where crossed boxes represent received PDCP SDUs, while empty boxes represent non-received PDCP SDUs (or possibly not correctly decompressed PDCP PDUs). In this example, the SNs of the last in sequence PDCP SDU, the first non-received PDCP SDU and the last received PDCP SDU are 3, 4 and M respectively. So there are M-3 non in sequence received PDCP SDUs (i.e. PDCP SDUs from the first non-received PDCP SDU to the last received SDU), for which status information should be provided in the bitmap of the PDCP status report. The higher M is, the longer the bitmap should be.

A very long PDCP status report may create a very large overhead however. Also it implies that the UE implementation has to provision for being able to create a very large PDCP status report, although in most of the cases only a rather small PDCP status report is needed in practice.

An object of the present invention is to overcome this disadvantage.

SUMMARY OF THE INVENTION

The invention proposes a wireless communication method for transmitting a status report for a sequence of data transmitted along a wireless communication link between a wireless device and a network having a plurality of base stations, the wireless communication link having a data unit transmitting side and a data unit receiving side.

The method comprises:
on the data unit receiving side, determining status information on data units of the sequence, including a first set of data units comprising a first non-received data unit in the sequence and data units following said first non-received data unit in the sequence, the status information indicating, for each data unit, whether said data unit has been received or not on the data unit receiving side; and
transmitting, from the data unit receiving side to the data unit transmitting side of the wireless communication link, a status report containing a bitmap providing the status information for a second set of data units included in said first set of data units, such that the bitmap has a predetermined maximum size.

Since the bitmap has a predetermined maximum size, overhead can be limited and the UE implementation is simplified as the variation in size of the status report is reduced.

In case the first set of data units is not too big however, the second set of data units could be identical to the first set, so that there is no loss of status information in the bitmap.

Advantageously, the method further comprises receiving at least one data unit of said second set of data units from the data unit transmitting side, wherein the at least one data unit of said second set of data units has not been received on the is data unit receiving side.

Advantageously, the method further comprises selectively retransmitting data units of said second set of data units along the wireless communication link depending on the bitmap contained in the status report.

The above mentioned status report format can be used in downlink and/or in uplink. It may also be used in a status message transmitted between a source node and a target node.

The status report may be transmitted between the wireless device and a target base station after a handover of the wireless communication link with the wireless device has been initiated from a source base station to a target base station. However, it may also be transmitted between the wireless device and a base station of the network, while no handover of the wireless communication link occurs.

Many scenarios can be envisaged to determine the second set of data units from the first set of data units. The second set may for instance include: data units following immediately the first non-received data unit in the sequence, a maximum number of non-received data units of the first set of data units, a maximum number of received data units of the first set of data units, and/or a last received data unit of the first set of data units.

The predetermined maximum size may be fixed for every wireless communication link or it may take different values depending on the wireless communication links and/or depending on some circumstances.

It may be signaled to the data unit receiving side for building the status report and/or broadcasted by the network in system information messages.

It may also be set at the wireless communication link setup or within the framework of a handover of the wireless communication link.

For the data units of the first set which are not part of the second set, different strategies may be applied by the data unit transmitting side of the wireless communication link. Indeed, all of them, only part of them or even none of them may be retransmitted to the data unit receiving side of the wireless communication link.

Another aspect of the invention relates to a wireless device arranged for receiving a sequence of data transmitted from a network having a plurality of base stations. The wireless device comprises:

a determination unit for determining status information on data units of the sequence, including a first set of data units comprising a first non-received data unit in the sequence and data units following said first non-received data unit in the sequence, the status information indicating, for each data unit, whether said data unit has been received or not by the wireless device; and a transmission unit for transmitting to the network, a status report containing a bitmap providing the status information for a second set of data units included in said first set of data units, such that the bitmap has a predetermined maximum size.

Still another aspect of the invention relates to a network having a plurality of base stations, arranged for receiving a sequence of data transmitted from a wireless device. The network comprises:

a determination unit for determining status information on data units of the sequence, including a first set of data units comprising a first non-received data unit in the sequence and data units following said first non-received data unit in the sequence, the status information indicating, for each data unit, whether said data unit has been received or not by the network; and a transmission unit for transmitting to the wireless device, a status report containing a bitmap providing the status information for a second set of data units included in said first set of data units, such that the bitmap has a predetermined maximum size.

Another aspect of the invention relates to a wireless communication method for transmitting a sequence of data units along a wireless communication link between a wireless device and a network having a plurality of base stations, the wireless communication link having a data unit transmitting side and a data unit receiving side.

The method comprises:

on the data unit receiving side, storing status information on data units of the sequence, including a first set of data units comprising a first non-received data unit in the sequence and data units following said first non-received data unit in the sequence, the status information indicating, for each data unit, whether said data unit has been received or not on the data unit receiving side;

transmitting, from the data unit receiving side to the data unit transmitting side of the wireless communication link, a status report containing a bitmap providing the status information for a second set of data units included in said first set of data units, such that the bitmap has a predetermined maximum size; and selectively retransmitting data units of said second set of data units along the wireless communication link depending on the bitmap contained in the status report.

BRIEF DESCRIPTION THE DRAWINGS

Other objects, features and advantages of the invention will become apparent when reading the following description on non-limiting exemplary embodiments with reference to the accompanying drawings.

FIG. 1, already discussed, is a block diagram illustrating network structure of an E-UMTS (or LTE) system.

FIG. 2(a), 2(b) and 2(c), already discussed, are block diagrams depicting logic architecture of typical network entities of the LTE system (FIG. 2(a)), a user-plane (U-plane) protocol stack (FIG. 2(b)) and a control-plane (C-plane) protocol stack (FIG. 2(c)).

FIG. 3, already discussed, is a diagram illustrating a typical handover procedure in an LTE system in relation to a communication including the transmission in sequence of data units from the source eNodeB to the UE.

FIG. 4, already discussed, is a diagram illustrating a typical handover procedure in an LTE system in relation to a communication including the transmission in sequence of data units from the UE to the source eNodeB.

FIG. 5, already discussed, shows the format of a PDCP status report sent from the UE to the target eNodeB during a handover procedure.

FIG. 6, already discussed, schematically shows a reception status comprising M-3 non in sequence received PDCP SDUs.

Figure 7:
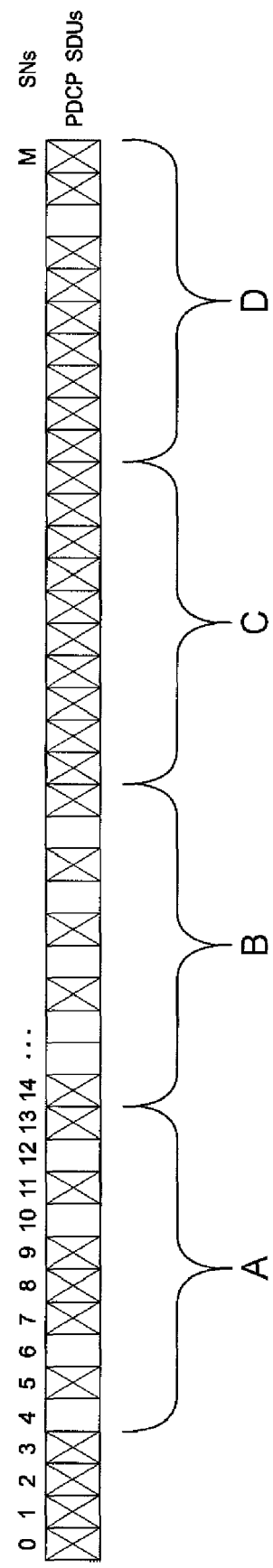

FIG. 7 shows different exemplary scenarios A-D for selecting PDCP SDUs to be reported in a bitmap of a status report.

DESCRIPTION OF PREFERRED EMBODIMENTS

Like in the introduction, the invention will now be more particularly described in its application to the PDCP layer of a LTE or E-UMTS network. However, the invention would also apply to data units of other protocol layers and/or to other types of networks (e.g. UMTS), as will appear to one skilled in the art. In this case, the appropriate wireless device, base stations, data units, etc. will replace the UE, eNodeBs, PDCP SDUs, etc. mentioned in the context of LTE.

The mechanisms described above can still apply. However, according to the invention, the format of the PDCP status report is modified as follows.

Considering that, on the data unit receiving side of the wireless communication link, status information is determined for a first set of PDCP SDUs comprising the first non-received PDCP SDU in the sequence and PDCP SDUs following the first non-received PDCP SDU in the sequence (i.e. non in sequence received PDCP SDUs), the status report contains a bitmap providing the status information for a second set of PDCP SDUs included in said first set of PDCP SDUs, such that the bitmap has a predetermined maximum size.

In other words, the size of the bitmap and thus of the PDCP status report is limited, so as not to exceed a predetermined maximum size. If the first set of PDCP SDUs is such that a bitmap providing the status information for said first set of PDCP SDUs would have a size less than or equal to the predetermined maximum size, then the second set of PDCP SDUs could be identical to the first set. However, if the first set of PDCP SDUs is such that a bitmap providing the status information for said first set of PDCP SDUs would have a size above the predetermined maximum size, then the second set of PDCP SDUs should be a subset of the first set.

As a non-limiting example, if the predetermined maximum size of the bitmap is 10 bits, the bitmap contained in the status report will provide the status information for a second set of 10 or less PDCP SDUs, included in the first set of PDCP SDUs. Of course, other values than 10 may be used.

In this way, the overhead created by the PDCP status report is limited. Also the UE implementation is simplified, as it does not have to provision for being able to create too long PDCP status reports.

The PDCP status report can further comprise a pointer designating a PDCP SDU of the sequence with reference to which the PDCP SDUs of the second set of PDCP SDUs can be identified on the data unit transmitting side of the wireless communication link.

The LIS field can play this role. In this case, the second set of PDCP SDUs for which the bitmap of the status report provides the status information could advantageously be the PDCP SDUs having the SNs LIS+1 to LIS+bm, where LIS represents the SN contained in the LIS field and bm represents the predetermined maximum size of the bitmap.

Alternatively, a FMS (for First Missing Sequence number) field containing the sequence number of the first non-received PDCP SDU in the sequence, used in place of the above mentioned LIS field, could play this role. In this case, the second set of PDCP SDUs for which the bitmap of the status report provides the status information could advantageously be the PDCP SDUs having the SNs FMS+1 to FMS+bm, where FMS represents the SN contained in the FMS field and bm represents the predetermined maximum size of the bitmap.

Of course, other pointers designating a PDCP SDU of the sequence with reference to which the PDCP SDUs of the second set of PDCP SDUs can be identified on the data unit transmitting side of the wireless communication link could also be used in addition to or in place of the LIS/FMS field.

Like in the above examples, the bitmap may relate to consecutive PDCP SDUs of the sequence, i.e. PDCP SDUs having consecutive sequence numbers. However, the second set of PDCP SDUs may alternatively comprise non consecutive PDCP SDUs (e.g. only odd SNs, only even SNs, specific series of SNs, etc.).

FIG. 7 shows different exemplary scenarios for selecting the second set of PDCP SDUs, i.e. the non in sequence received PDCP SDUs the status information of which is provided in the bitmap.

In the example shown in FIG. 7, there are M-3 non in sequence received PDCP SDUs from the first non-received PDCP SDU (SN 4) to the last received PDCP SDU (SN M). In the prior art, such situation would have led to a bitmap of M-3 bits. According to the invention, the number of bits of the bitmap is limited to a predetermined number, e.g. 10. This 10 bits bitmap does not cover the complete space between the first non-received PDCP SDU and the last received PDCP SDU (as M>13).

According to a first scenario A, the second set of PDCP SDUs, i.e. the 10 non in sequence received PDCP SDUs the status of which should be reflected in the bitmap of the PDCP status report, includes PDCP SDUs following immediately the first non-received PDCP-SDU having SN 4.

When the PDCP status report format shown in FIG. 5 is used, this can be achieved by putting SN 3 in the LIS field, followed by a bitmap of 2 octets including 10 bits indicating whether the PDCP SDUs having SNs 4 to 13 have been received or not. In this case, the bitmap thus contains status information for the first non-received PDCP-SDU itself.

Alternatively, if the FMS field is used in place of the LIS field, it would include SN 4 and be followed by a bitmap of 2 octets including 10 bits indicating whether or not the PDCP SDUs having SNs 5 to 14 have been received or not. One additional information bit is hereby provided in this case (for SN 14), as no status information for the first non-received PDCP PDU is included in the bitmap (but it can be derived from the presence of the SN of said first non-received PDCP PDU in the FMS field of the PDCP status report).

According to scenario B, the 10 PDCP SDUs the status of which should be reflected in the bitmap of the PDCP status report are selected so as to include a maximum number of non-received PDCP SDUs in between the first non-received PDCP PDU and the last received PDCP PDU.

When the PDCP status report format shown in FIG. 5 is used, this can be achieved by putting SN 13 in the LIS field, followed by a bitmap of 2 octets including 10 bits indicating whether the non in sequence received PDCP SDUs having SNs 14 to 23 have been received or not.

Alternatively, if the FMS field in place of the LIS field, it may also include SN 13 and be followed by a bitmap of 2 octets including 10 bits indicating whether the non in sequence received PDCP SDUs having SNs 14 to 23 have been received or not.

According to scenario C, the 10 PDCP SDUs the status of which should be reflected in the bitmap of the PDCP status report are selected so as to include a maximum number of received PDCP SDUs in between the first non-received PDCP PDU and the last received PDCP PDU.

Again, this could be achieved for instance by setting the LIS field or FMS field of the PDCP status report accordingly.

According to scenario D, the 10 PDCP SDUs the status of which should be reflected in the bitmap of the PDCP status report are selected so as to include the last received PDCP PDU having SN M.

This could be achieved by setting a LIS field or a FMS field of the PDCP status report to SN M-10.

Other scenarios may also be used for defining the second set of non in sequence received PDCP SDUs, as will appear to one skilled in the art.

Such construction of the bitmap may apply both for a PDCP status report sent from the UE to the target eNodeB as shown in FIG. 3 or for a PDCP status report sent from the target eNodeB to the UE as shown in FIG. 4.

It may also apply for the bitmap included in the SN status transfer message (reference 5' in FIG. 4) sent from the source eNodeB to the target eNodeB.

When the PDCP status report is sent from the UE to the target eNodeB as shown in FIG. 3, the target eNodeB can then analyze it to check from the bitmap whether the reported PDCP SDUs have been received or not.

In this way, selective retransmission can be performed by the target eNodeB depending on the bitmap contained in the PDCP status report. Indeed, the target eNodeB may discard at least some of the received PDCP SDUs, and retransmit to the UE at least some of the PDCP SDUs that are not received by the UE and optionally at least some of the PDCP PDUs for which decompression has failed in the UE.

But as the number of PDCP SDUs reported in the bitmap is limited, there may exist some unreported PDCP SDUs for which the target eNodeB cannot know whether they have been received or not. The target eNodeB would then have to rely on the PDCP SDUs that are forwarded by the source eNodeB and choose to retransmit them or not.

For instance, the target eNodeB may transmit all PDCP SDUs forwarded by the source eNodeB and thus potentially retransmit PDCP SDUs that had already been received by the UE. In another example, the target eNodeB may choose not to retransmit the unreported PDCP SDUs, as retransmission may also take place in upper layers, such as at TCP (Transmission Control Protocol) level.

Similar mechanisms can take place when the PDCP status report is sent from the target eNodeB to the UE as shown in FIG. 4.

The predetermined maximum size of the bitmap may be a fixed number for every wireless communication link. In this case, the maximum size of the PDCP status report would be fixed as well. For example, such fixed value may be required by the standard.

Alternatively, the predetermined maximum size of the bitmap may take different values.

The predetermined maximum size value to be used or information from which the value to be used can be derived may be signaled to the data unit receiving side of the wireless communication link for building the status report.

Advantageously, the predetermined maximum size of the bitmap may be set at the wireless communication link setup (e.g. Radio Bearer setup) or within the framework of a handover procedure of the wireless communication link.

It is also possible for the network to broadcast, in system information messages, the predetermined maximum size of the bitmap or information from which the predetermined maximum size of the bitmap can be derived.

Of course, other possibilities may be suitable as well, as will appear to one skilled in the art.

It will also be noted that while the transmitter of a PDCP status report knows the predetermined maximum size of the bitmap, the receiver may or may not know it.

The present invention has been described above in the case where a PDCP status report is transmitted between a UE and a target eNodeB, after a handover of the wireless communication link with the UE from a source eNodeB to a target eNodeB has been initiated. For example, in the downlink case, the UE may configure the PDCP status report after having received an indication that a handover has occurred from an upper layer.

However, transmitting such status report and possibly performing selective retransmission based on the status report according to the invention may also apply to a wireless communication link between a UE and an eNodeB, while no handover of the wireless communication link occurs. As a non limiting example, a PDCP status report may be transmitted along the wireless communication link when there are some reasons to think that up to date RLC status information were not or will not be received on the data unit transmitting side of the wireless communication link.

What is claimed is:

1. A wireless communication method for transmitting a status report for a sequence of data units transmitted over a wireless communication link between a wireless device and a network having a plurality of base stations, the wireless communication link having a data unit transmitting side and a data unit receiving side, the method comprising:

receiving, by the data unit receiving side, the data units of the sequence, wherein the received data units of the sequence include a first set of data units starting at a first non-received data unit in the sequence and further comprising data units following the first non-received data unit in the sequence;

determining, by the data unit receiving side, status information related to the data units of the sequence, the status information indicating whether each of the data units of the sequence has been received by the data unit receiving side; and transmitting, from the data unit receiving side to the data unit transmitting side, the status report comprising a bitmap providing the status information for only a subset of the first set of data units, wherein an overhead is created by the transmission of the status report, wherein the bitmap has a maximum size for reducing the overhead, and wherein the status report is a Protocol Data Convergence Protocol (PDCP) status report.

2. The method as claimed in claim 1, further comprising receiving at least one data unit of said subset of said first set of data units from the data unit transmitting side, wherein the at least one data unit of said subset of said first set of data units was not previously received by the data unit receiving side.

3. The method as claimed in claim 1, further comprising initiating a handover of the wireless communication link with the wireless device from a source base station to a target base station, before transmitting the status report from the data unit receiving side to the data unit transmitting side of the wireless communication link.

4. The method as claimed in claim 3, wherein the wireless device is on the data unit receiving side and the network is on the data unit transmitting side of the wireless communication link, at least some data units of the sequence are forwarded from the source base station to the target base station, the status report is transmitted from the wireless device to the target base station and data units of said subset of said first set of data units are selectively retransmitted from the target base station to the wireless device.

5. The method as claimed in claim 3, wherein the wireless device is on the data unit transmitting side and the network is on the data unit receiving side of the wireless communication link, the status information related to the data units of the sequence is sent from the source base station to the target base station, the status report is transmitted from the target base station to the wireless device and data units of said subset of said first set of data units are selectively retransmitted from the wireless device to the target base station.

6. The method as claimed in claim 1, wherein the status report further comprises a pointer designating one of the data units of the sequence with reference to which the data units of the subset of said first set of data units can be identified on the data unit transmitting side of the wireless communication link.

7. The method as claimed in claim 1, further comprising selecting, by the data unit receiving side, the subset of said first set of data units to comprise consecutive data units of the data units of the sequence.

8. The method as claimed in claim 7, wherein the consecutive data units include data units following immediately the first non-received data unit in the sequence.

9. The method as claimed in claim 7, wherein the consecutive data units include a maximal number of non-received data units of the first set of data units.

10. The method as claimed in claim 7, wherein the consecutive data units include a maximal number of received data units of the first set of data units.

11. The method as claimed in claim 7, wherein the consecutive data units include a last received data unit of the first set of data units.

12. The method as claimed in claim 1, wherein the maximum size of the bitmap is fixed for every wireless communication link.

13. The method as claimed in claim 1, wherein the maximum size of the bitmap is set at the wireless communication link setup or within the framework of a handover of the wireless communication link.

14. The method as claimed in claim 1, wherein the maximum size of the bitmap or information from which the maximum size of the bitmap can be derived is signaled to the data unit receiving side for building the status report.

15. The method as claimed in claim 1, wherein the maximum size of the bitmap or information from which the maximum size of the bitmap can be derived is broadcasted by the network in system information messages.

16. The method as claimed in claim 1, wherein the maximum size of the bitmap is 10 bits.

17. A wireless device for receiving a sequence of data units transmitted from a network having a plurality of base stations, the wireless device comprising:

a receiving unit for receiving the data units of the sequence, wherein the received data units of the sequence include a first set of data units starting at a first non-received data unit in the sequence and further comprising data units following the first non-received data unit in the sequence;

a determination unit for determining status information related to the data units of the sequence, the status information indicating whether each of the data units of the sequence has been received by the wireless device; and a transmission unit for transmitting, to the network, a status report comprising a bitmap providing the status information for only a subset of the first set of data units, wherein an overhead is created by the transmission of the status report, wherein the bitmap has a maximum size for reducing the overhead, and wherein the status report is a Protocol Data Convergence Protocol (PDCP) status report.

18. The wireless device as claimed in claim 17, wherein the maximum size of the bitmap is 10 bits.

19. A network having a plurality of base stations, arranged for receiving a sequence of data units transmitted from a wireless device, the network comprising:

a receiving unit for receiving the data units of the sequence, wherein the received data units of the sequence include a first set of data units starting at a first non-received data unit in the sequence and further comprising data units following the first non-received data unit in the sequence;

a determination unit for determining status information related to the data units of the sequence, the status information indicating whether each of the data units of the sequence has been received by the network; and a transmission unit for transmitting, to the wireless device, a status report comprising a bitmap providing the status information for only a subset of the first set of data units, wherein an overhead is created by the transmission of the status report, wherein the bitmap has a maximum size for reducing the overhead, and wherein the status report is a Protocol Data Convergence Protocol (PDCP) status report.

20. The network as claimed in claim 19, wherein the maximum size of the bitmap is 10 bits.

* * * * *